United States Patent
Khodadadi et al.

(10) Patent No.: US 8,293,204 B2
(45) Date of Patent: Oct. 23, 2012

(54) CARBON NANOTUBES CONTINUOUS SYNTHESIS PROCESS USING IRON FLOATING CATALYSTS AND MGO PARTICLES FOR CVD OF METHANE IN A FLUIDIZED BED REACTOR

(76) Inventors: Abbas Ali Khodadadi, Tehran (IR); Yadollah Mortazavi, Tehran (IR)

( * ) Notice: Subject to any disclaimer, the term of this patent is extended or adjusted under 35 U.S.C. 154(b) by 255 days.

(21) Appl. No.: 12/642,794

(22) Filed: Dec. 19, 2009

(65) Prior Publication Data
US 2011/0150746 A1    Jun. 23, 2011

(51) Int. Cl.
*D01F 9/12* (2006.01)
*B82B 3/00* (2006.01)
(52) U.S. Cl. .................... 423/447.3; 977/843
(58) Field of Classification Search ............... 423/447.3; 977/843
See application file for complete search history.

(56) References Cited

U.S. PATENT DOCUMENTS
7,563,427 B2 * 7/2009 Wei et al. .................. 423/447.3
* cited by examiner

*Primary Examiner* — Stuart Hendrickson
(74) *Attorney, Agent, or Firm* — Barry Choobin; Choobin & Choobin Consultancy

(57) ABSTRACT

A novel continuous process is used for production of carbon nanotubes (CNTs) by catalytic chemical vapor deposition (CCVD) of methane on iron floating catalyst in-situ deposited on MgO in a fluidized bed reactor. In the hot zone of the reactor, sublimed ferrocene vapors were contacted with MgO powder fluidized by methane feed to produce Fe/MgO catalyst in-situ. An annular tube was used to enhance the ferrocene and MgO contacting efficiency. Multi-wall as well as single-wall CNTs were grown on the Fe/MgO catalyst while falling down the reactor. The CNTs were continuously collected at the bottom of the reactor, only when MgO powder was used. The annular tube enhanced the contacting efficiency and improved both the quality and quantity of CNTs. The SEM and TEM micrographs of the products reveal that the CNTs are mostly entangled bundles with diameters of about 20 nm. Raman spectra show that the CNTs have low amount of amorphous carbon with $I_G/I_D$ ratios as high as 10.2 for synthesis at 900° C. The RBM Raman peaks indicate formation of single-walled carbon nanotubes (SWNTs) of 1.0-1.2 nm diameter.

5 Claims, 16 Drawing Sheets

CARBON NANOTUBES CONTINUOUS SYNTHESIS PROCESS USING IRON FLOATING CATALYSTS AND MGO PARTICLES FOR CVD OF METHANE IN A FLUIDIZED BED REACTOR

SPONSORSHIP STATEMENT

The present invention is sponsored by Iran Nanotechnology Initiative Council, and Nanoscience and Nanotechnology Research center of University of Tehran (Iran).

BACKGROUND OF THE INVENTION

Carbon nanotubes (CNTs) have attracted considerable attention since their discovery due to their outstanding physical and chemical properties. Various synthesis methods have been developed for the production of CNTs, including electric arc discharge, laser vaporization, and catalytic chemical vapor deposition (CCVD). Many previous reports have shown the possibility of CNTs production on a large scale at a low cost.

Different types of reactor configurations including fixed-bed micro-reactors or small fluidized-bed reactors with short contact times are employed for the CVD synthesis of CNTs. "Fixed bed", "floating catalyst", and "fluidized bed" method are most common processes for the CCVD growth of CNTs.

The efficiency of CNTs production in the fixed-bed reactor is severely limited by inhomogeneous gas-solid mixing along the catalyst bed, with the dense packing of the catalyst particle preventing both CNTs production and dissipation of by-products. This situation is worsened by the growing nanotubes forming a mat that covers the catalyst bed. These problems can be solved by fluidizing the catalyst particles in a confined reactor by using a carbon source gas heated to the synthesis temperature.

Gas-solid fluidization is extremely difficult for ultrafine particles (including nanoparticles), since inter-particle forces are greater than the hydrocarbon. This is because ultrafine particles adhere to each other tightly in all directions by van der Waals or other forces, which seriously limit their fluidization. Fortunately, when particle size decreases to nanoscale, things can be different. For nanoparticles that are not zero-dimensional or that can coalesce into fractal subsets, that inter-particle force varies significantly with the packing structure and can be exploited for fluidization of ultrafines.

Recent research demonstrated that in the nano-agglomerated fluidized bed reactor (NAFBR), sufficient growing space, uniform temperature and concentration distribution and good mass and heat transfer lead to much higher yield, more uniform macroscopic properties and relatively perfect micro-structures of carbon nanotubes.

In the present invention, advantages of both CVD in a fluidized bed reactor and a floating catalyst are employed for continuous production of carbon nanotubes using methane as the carbon source. The Fe/MgO catalyst is prepared in-situ in a hot zone of the fluidized bed reactor and the CNTs on the catalyst are continuously produced. The influence of operating parameters including ferrocene sublimation rate and temperature on quality of the produced CNTs is reported.

SUMMARY OF INVENTION

The primary object of present invention is to provide a process for continuous production of carbon nanotubes (CNTs) by means of chemical vapor deposition (CVD) of methane over Fe/MgO catalyst produced by in-situ decomposition of ferrocene (floating catalyst) on fluidized MgO particles comprising steps of: forming Iron nanoparticles on MgO exterior surface by decomposition of ferrocene in the hot zone of the fluidized bed system. This way, in addition to provision of a large surface area for CNTs growth, the wasting of the catalyst in the internal porous structure of the catalyst, as in the common CVD catalysts, is prevented.

Still another object of the present invention is to provide a method for continuous production of carbon nanotubes by chemical vapor deposition of at least one carbon containing compound over a fluidized catalyst in a reactor, wherein said catalyst is synthesized inside said reactor by decomposition of at least one transition metal compound over at least one carrier.

In one aspect of the present invention, nitrogen, oxygen, carbon dioxide, water, steam or a combination thereof is introduced into said reactor.

In another aspect of the present invention the transition metal compound is mixed with said carbon containing compound.

In another aspect of the present invention the carbon containing compound is selected from a group comprising: alkanes, alkenes, alkynes, naphthenes, aromatics, carbon oxides, ketones, aldehydes, alcohols, esters and organic acids, or a combination thereof.

In another aspect of the present invention the transition metal compound is selected from a group comprising: organometallic, halide, nitrate, and carbonyl compound of iron, nickel, cobalt, molybdenum, and tungsten, or a combination thereof.

In another aspect of the present invention the transition metal compound is selected from a group consisting: organometallic, halide, nitrate, and carbonyl compound of iron, nickel, cobalt, molybdenum, and tungsten, or a combination thereof.

In another aspect of the present invention the carrier is selected from a group comprising: semiconducting, and insulating oxides or a combination thereof.

Yet another object of the present invention is to provide a system for producing carbon nanotubes, wherein said system comprises:
A fluidized reactor;
An injection mechanism, wherein said injection mechanism feeds at least one transition metal compound into said reactor;
A means for decomposing said transition metal compound inside said reactor;
A means for introducing carrier into said reactor; and
A means for fluidizing said carrier inside said reactor.

In another aspect of the present invention, CNTs are grown on the fluidized Fe/MgO catalyst, rather than on the reactor walls. This facilitates the continuous CNTs withdrawal suitable for large scale production. Confining the ferrocene and MgO contact space by an annular tube leads to higher quality CNTs, due probably to smaller iron nanoparticles formed in the more efficient contact of ferrocene and MgO. Increasing the flow rate of ferrocene and decreasing the synthesis temperature results in higher quality CNTs. The highest $I_G/I_D$ ratio of 10.2 is obtained at 900° C. with the annular tube in place. MWNTs of about 20 nm size as well as SWNTs of 1.0-1.2 nm diameter are formed in the fluidized bed system.

A continuous process is used for production of carbon nanotubes (CNTs) by catalytic chemical vapor deposition (CCVD) of methane on iron floating catalyst in-situ deposited on MgO in a fluidized bed reactor. In the hot zone of the reactor, sublimed ferrocene vapors were contacted with MgO powder fluidized by methane feed to produce Fe/MgO catalyst in-situ. An annular tube was used to enhance the ferrocene and MgO contacting efficiency. Multi-wall as well as single-wall CNTs were grown on the Fe/MgO catalyst while falling down the reactor. The CNTs were continuously collected at the bottom of the reactor, only when MgO powder was used. The annular tube enhanced the contacting efficiency and improved both the quality and quantity of CNTs.

The SEM and TEM micrographs of the products reveal that the CNTs are mostly entangled bundles with diameters of about 20 nm. Raman spectra show that the CNTs have low amount of amorphous carbon with $I_G/I_D$ ratios as high as 10.2 for synthesis at 900° C. The RBM Raman peaks indicate formation of single-walled carbon nanotubes (SWNTs) of 1.0-1.2 nm diameter. Other objects, features and advantages of the present invention will become apparent from the following detailed description when read in conjunction with the accompanying figures and appended claims.

DETAILED DESCRIPTION OF INVENTION

Experimental Procedure

Figure 1:
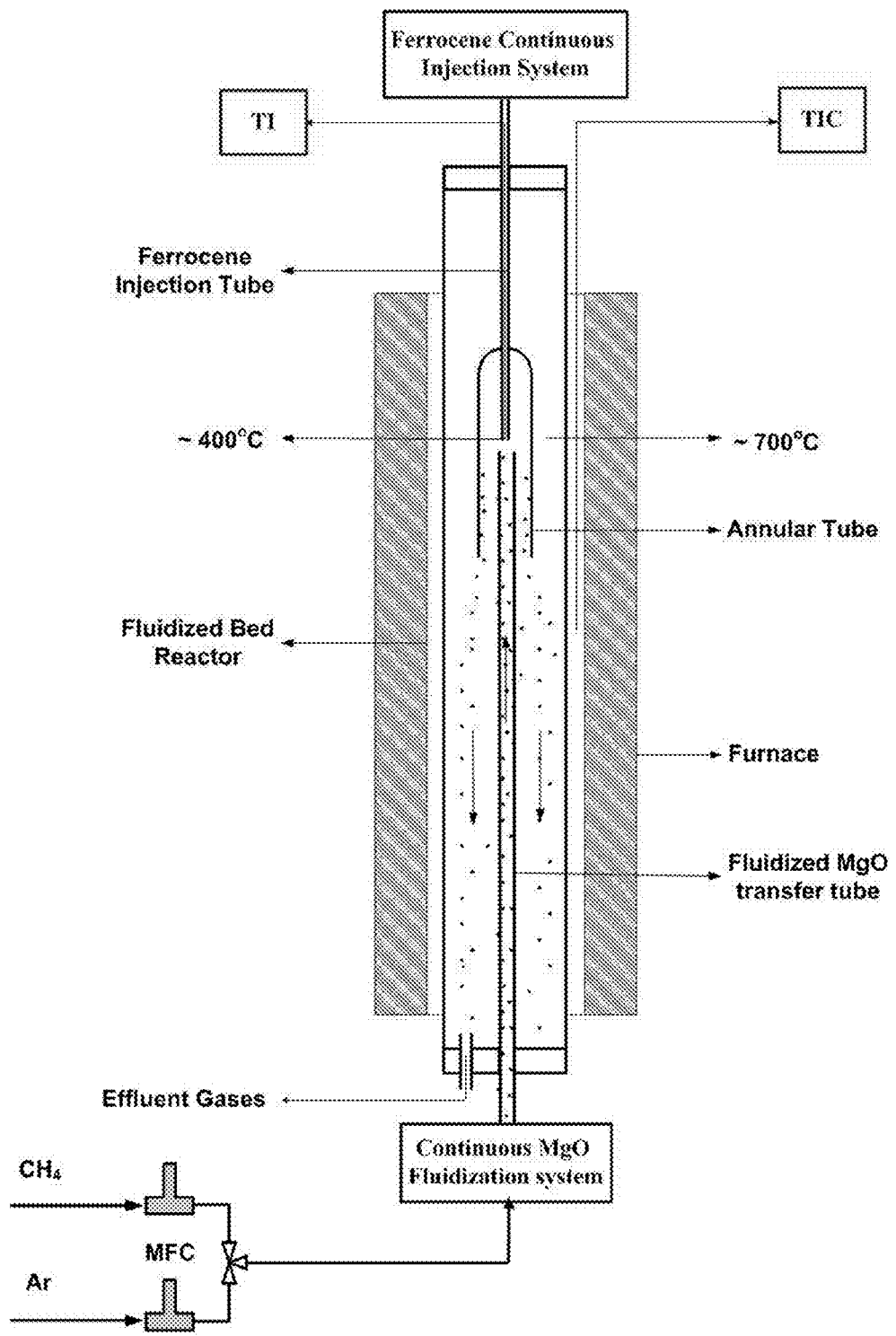
FIG. 1 is a schematic diagram of the continuous fluidized bed system used for CNTs synthesis.

FIG. 1 shows the system used for synthesis of CNTs. The system has three main parts including ferrocene continuous injection and fluidized MgO introduction systems and the fluidized bed reactor.

The ferrocene injection system includes a tube packed with 60-100 mesh ferrocene particles, through which 60-120 sccm argon was flowing. The tube was placed in a constant and uniform temperature bath at 150° C. The ferrocene injection system is placed on top of the fluidized bed reactor and ferrocene is injected in the hot (~700° C.) zone of the reactor, through an extended tube. An air cooling system was used to prevent overheating of the ferrocene in the tube to temperatures higher than 400° C. At temperatures higher than 460° C. ferrocene decomposition becomes significant. To enhance the contact of ferrocene and MgO in the reactor, a larger diameter (annular) tube covering both the ferrocene injection tube and the fluidized MgO introduction tube, was used. 1-µm MgO powder (Merck) was pressed and sized to 150 µm average diameter particles and continuously introduced to a fluidization chamber through a star valve at a rate of about 0.15 g/min. 1500 sccm methane, as the carbon source for CNTs synthesis, fluidized and transferred the Go particles to the top of the reactor, about 1 cm away from the ferrocene injection tube. The ID of the MgO transfer tube is 0.9 cm and its length is 70 cm. The methane and MgO was heated to about the synthesis temperature, while passing through the MgO transfer tube.

The fluidized bed reactor was 4 cm ID, 85 cm long quartz tube, the temperature of which was measured at the middle point. 25 cm of the reactor in the middle part was uniform within ±5° C. In hot section of the reactor, ferrocene decomposes to iron species and are supported on the fluidized hot MgO particles. A piece of quartz wool was placed at the bottom of the reactor to collect the carbon nanotubes on the catalyst.

For CNTs synthesis, the temperature of ferrocene injection system and fluidized bed reactor was brought to 150 and 900-1000° C., respectively. Argon was used to purge out the air in the systems and then the flow of argon through the MgO introduction system was switched to 1500 sccm of methane. The CNTs synthesis was continued for 15 min, and then the system was cooled under argon to room temperature. The other conditions of different experimental runs are summarized in Table 1.

As synthesized CNTs was characterized by atomic absorption microscopy (AAS), scanning and transmission electron microscopy (SEM (Philips LX30) and TEM (Philips CM 200 FEG)) and Raman spectroscopy (Thermo Nicolet Almega XR Dispersive Raman Spectrometer using 532 nm line from an argon laser).

AAS was used to measure the amount of iron deposited on the MgO particles. The as synthesized CNTs/MgO was heated in air to 700° C. for 2 h to burn the CNTs. Then the iron oxide and MgO were dissolved in 37% hydrochloric acid for AAS quantification of iron.

TABLE 1

Conditions of experimental runs of carbon nanotubes synthesis in the continuous fluidized bed system

| | Conditions | | | |
|---|---|---|---|---|
| | MgO as the support | Annular tube | Growth Temperature (° C.) | Argon Flow (sccm) |
| Run 1 | not used | not used | 950 | 60 |
| Run 2 | used | not used | 950 | 60 |
| Run 3 | used | used | 950 | 60 |
| Run 4 | used | used | 950 | 120 |
| Run 5 | used | used | 900 | 60 |
| Run 6 | used | used | 1000 | 60 |

Without the use of MgO particles as the support for iron nanoparticles, which are formed from the decomposition of the ferrocene, no CNTs on Fe/MgO are collected at the bottom of the reactor, while significant amount of CNTs are formed on the quartz reactor wall?. FIG. 2 shows the SEM micrographs of as synthesized samples in the presence of MgO particles. When the MgO particles are contacted with ferrocene vapors, presumably iron nanoparticles on the surface of MgO are formed, leading to a dense population of CNTs. Ferrocene vapors at about 400° C. enter the hot zone of the reactor at nearly 700° C., immediately decompose to iron species, and finally form iron nanoparticles on MgO particles. Ferrocene may decompose both in the vapor phase and on MgO. Iron nanoparticles formed on the MgO particles in the early periods of its contact with ferrocene may enhance its further decomposition on MgO. The amount of iron in the as-synthesized CNT-Fe/MgO sample determined by AAS is about 3.0% of the Fe/MgO catalyst. This indicates that about 60% of iron introduced by the ferrocene is deposited on the MgO particles. The close contact of the MgO particles with ferrocene vapors enhances the deposition of iron nanoparticles on the MgO rather than on the reactor wall.

The carbon yield on Fe/MgO catalyst of Run-2 is about 35 wt %. CNTs are mostly formed on the MgO particles, rather than the quartz reactor wall, and fall down the reactor facilitating the continuous operation of the system.

Figure 2A:
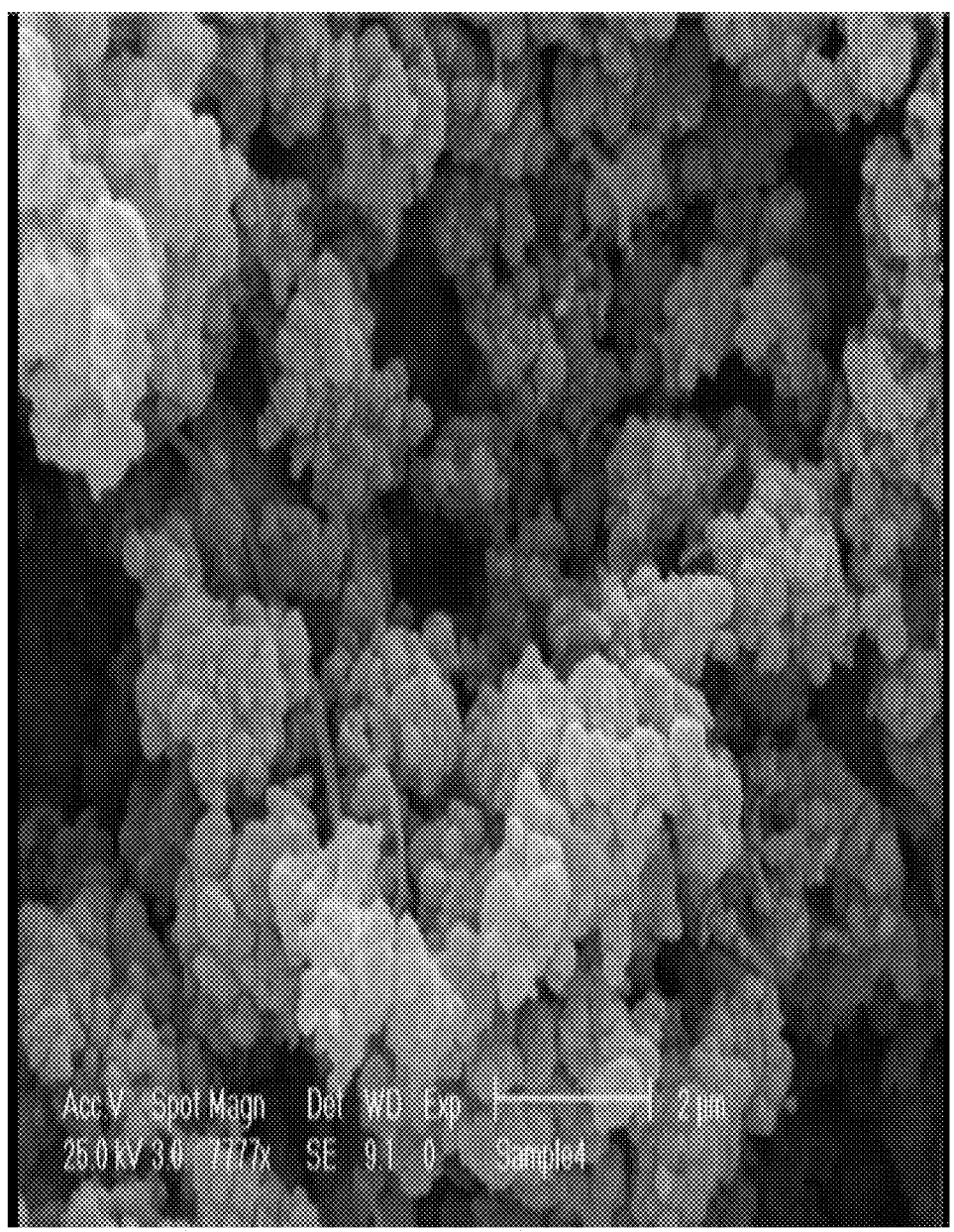
FIGS. 2a-2d show a Typical SEM micrograph of CNTs (a) Run 1, (b) Run 2, (c) and (d) TEM micrographs of Run 2 CNTs.
Figure 2B:
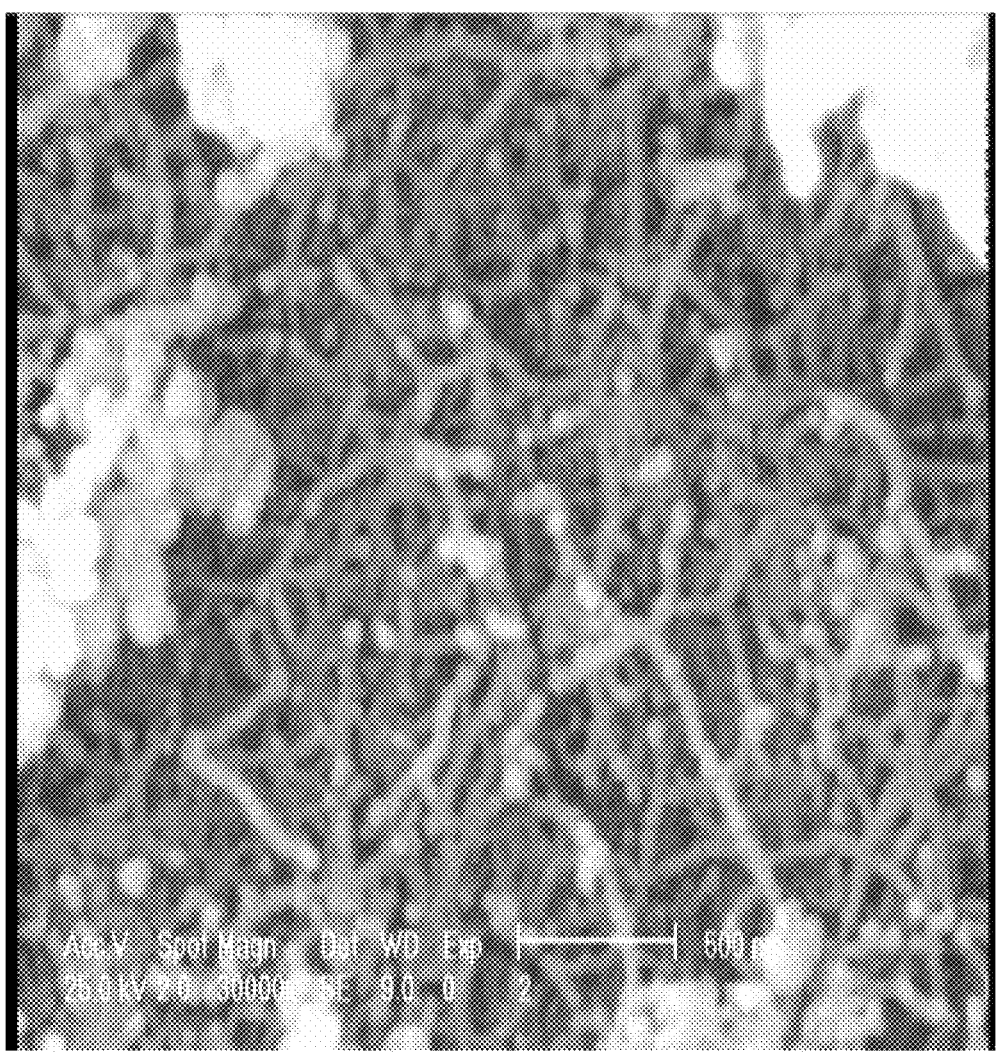
Figure 2C:
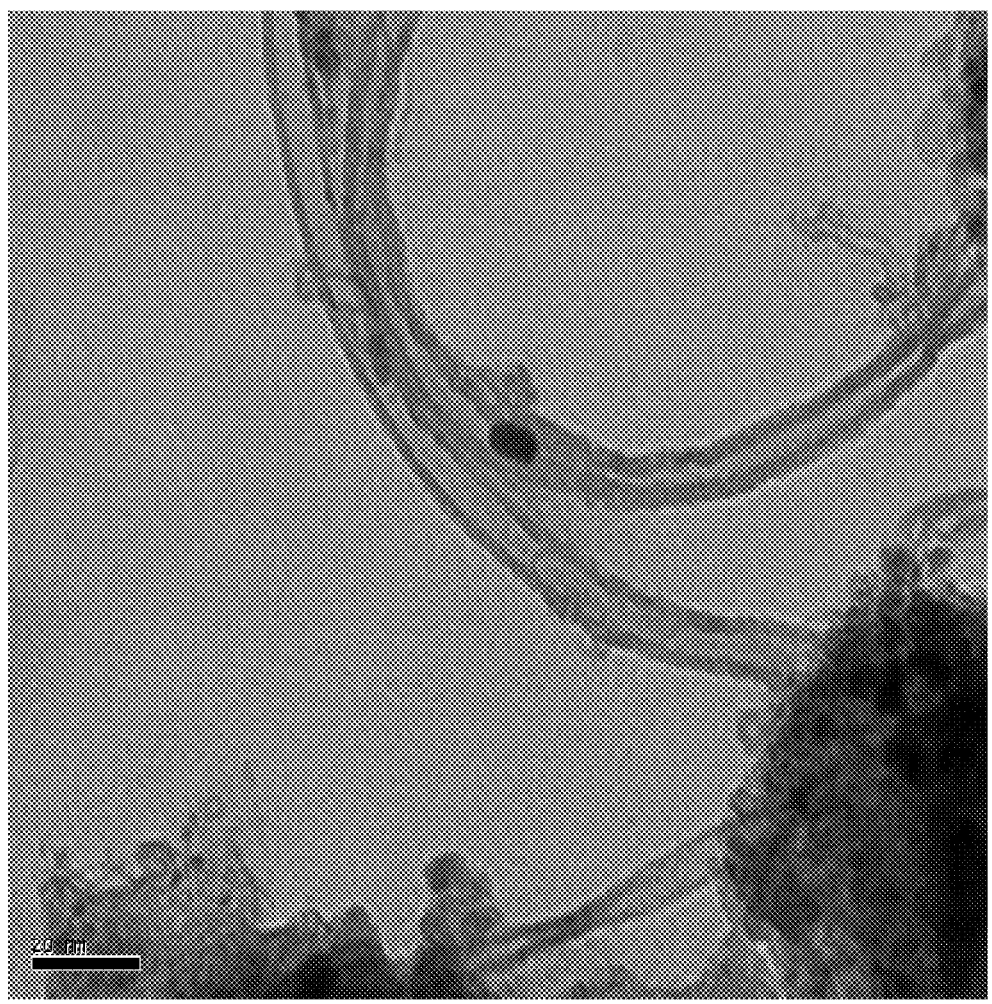
Figure 2D:
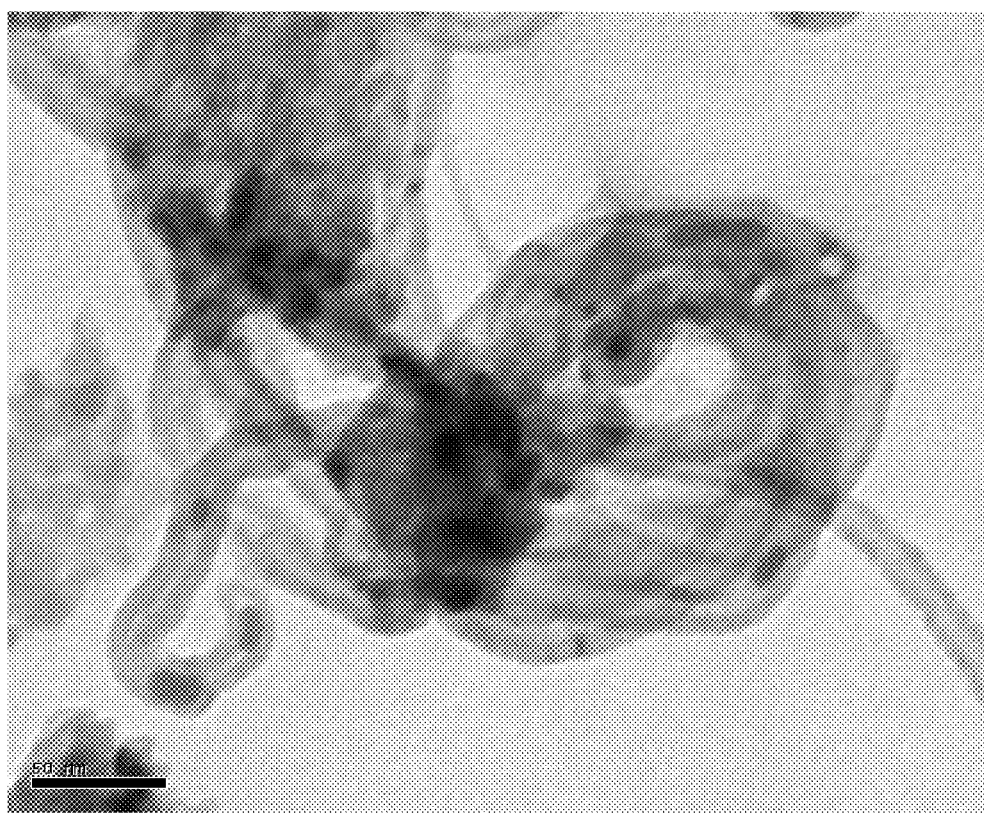

The TEM micrographs presented in FIGS. 2c and d indicate the formation of multi-wall carbon nanotubes (MWNTs) of about 15-20 nm. Iron nanoparticles, dark spots in the TEM images, of about 5-10 nm size can be seen in and/or on the CNTs. FIG. 2d shows that entangled CNTs loops are formed on several iron nanoparticles. Rotation of the catalyst particles during falling down the reactor may have caused the formation of such CNTs loops.

Run-3 is performed at the same conditions as Run-2, except that the annular tube, covering the tip of ferrocene injection tube and the top of the MgO transfer tube, was used. This way, the deposition efficiency of the iron on MgO particles increases from 60 to 92%. The same amount of MgO powder as in Run-2 confined to a lower volume of the annular tube causes a significant increase in the concentration of the particles and thus the deposition efficiency.

Figure 4:
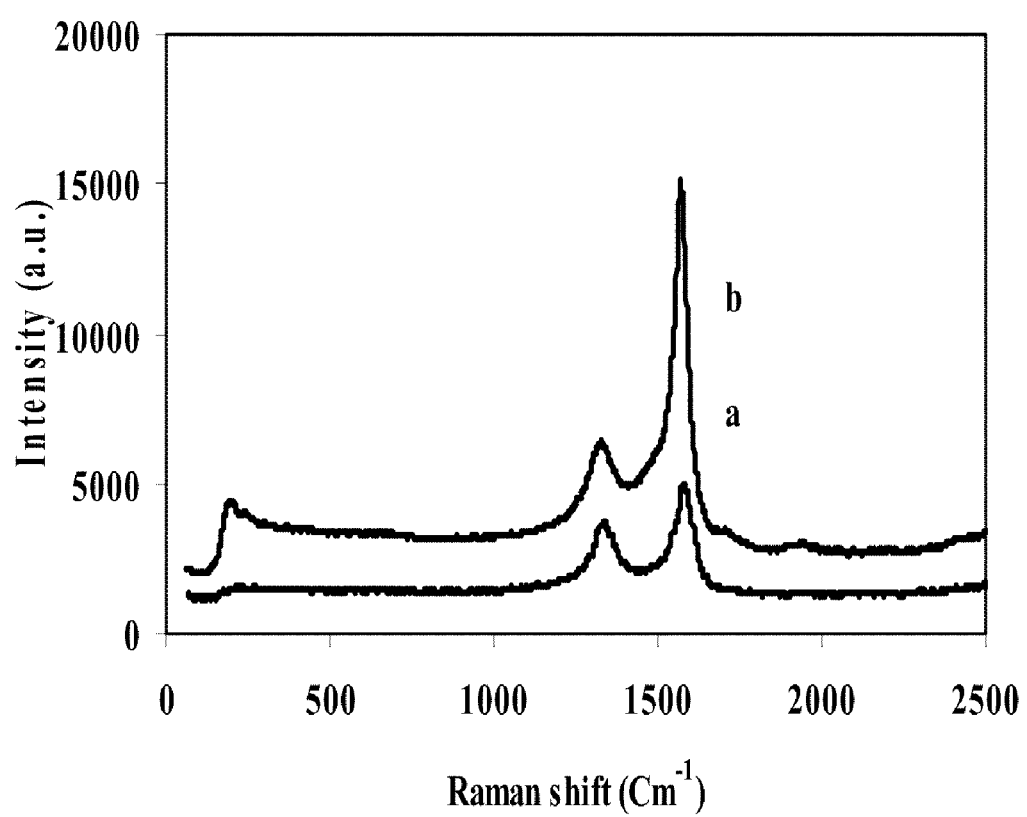
FIG. 4—Raman spectra of CNTs grown of (a) run 2 and (b) run 3.

Raman spectra of the CNTs with and without the annular tube are plotted in FIG. 4. The sharp peak at about 1570 cm$^{-1}$ (G band) corresponds to a splitting of the $E_{2g}$ stretching mode of graphite, which is the characteristic of CNTs. The peak at about 1330 cm$^{-1}$ (D band) is attributed to the presence of residual ill-organized graphite and amorphous carbon. The radial breathing mode (RBM) peaks of Raman spectra at low frequencies suggests that significant amounts of single-wall carbon nanotubes (SWNTs) exist in our CNTs samples.

The $I_G/I_D$ ratios of G and D band intensities, as an indication of the quality of the CNTs, for the fluidized-bed system with and without annular tube are 3.8 and 1.5, respectively. This demonstrated that for both cases quantity of CNTs in the product is higher than defective structure and amorphous carbon. The $I_G/I_D$ ratio significantly improves when the annular tube was used. The annular tube confines the contact volume of the ferrocene and the MgO powder, leading to higher concentration of MgO particles with shorter distances. This way, the ferrocene and its decomposition product of iron nanoparticles, may have less chance of colliding with each other and forming larger iron nanoparticles. Therefore, when the annular tube is used, smaller iron nanoparticles are formed on MgO particles. This results in higher quality CNTs, as indicated by the larger $I_G/I_D$ of the sample. Also significant RBM peak is only observed for the CNTs synthesis with the annular tube placed in the fluidized-bed system. This is an indication of the formation of single wall carbon nanotubes (SWNTs) on very small iron nanoparticles The diameter (d, nm) of the SWNTs was determined from the RBM frequency ($\omega_{RBM}$, cm$^{-1}$) according to Equation 1 for bundled SWNTs.

$$\omega_{RBM} = (238/d)^{0.93} \quad [1]$$

Figure 5A:
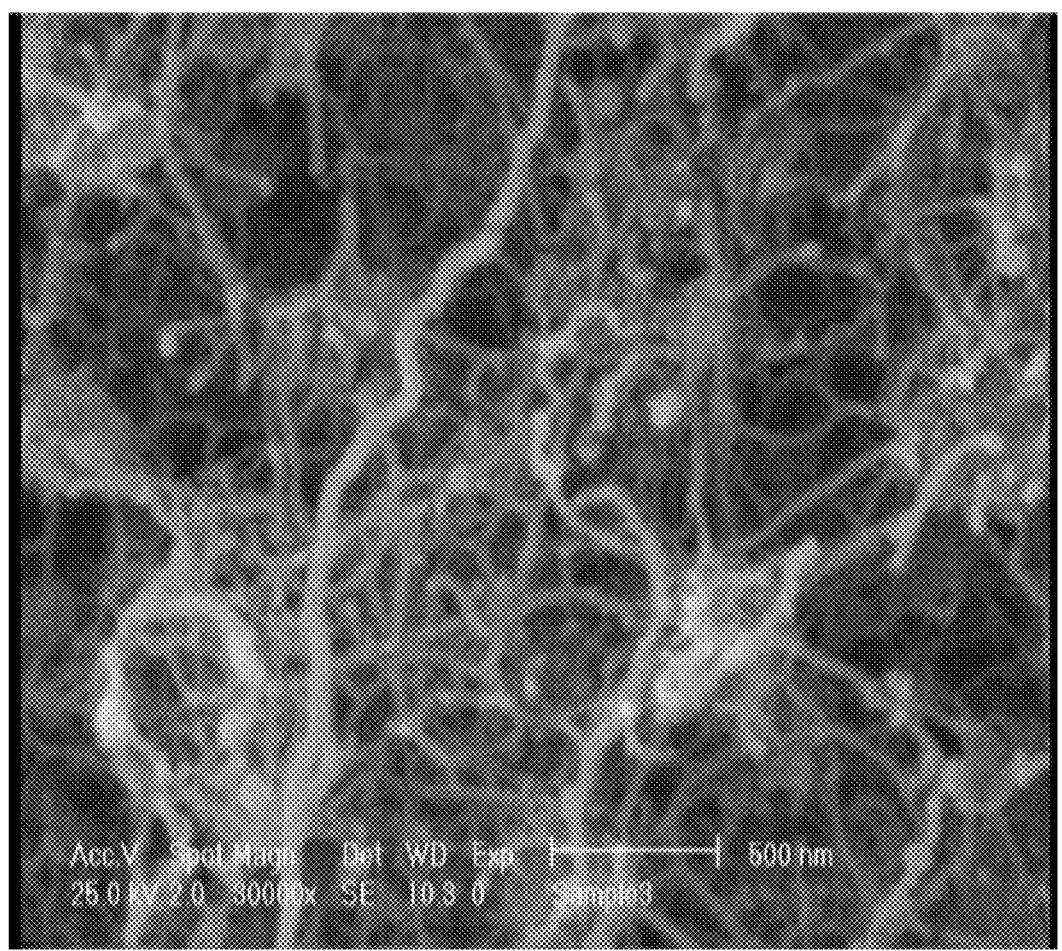
FIGS. 5a-5e illustrate SEM micrograph of CNTs of run 4, (b), (c), and (d) TEM micrographs of CNTs of run 4 (e) Raman spectrum of produced CNTs of run 3 (curve a) and run 4 (curve b)
Figure 5B:
Figure 5C:
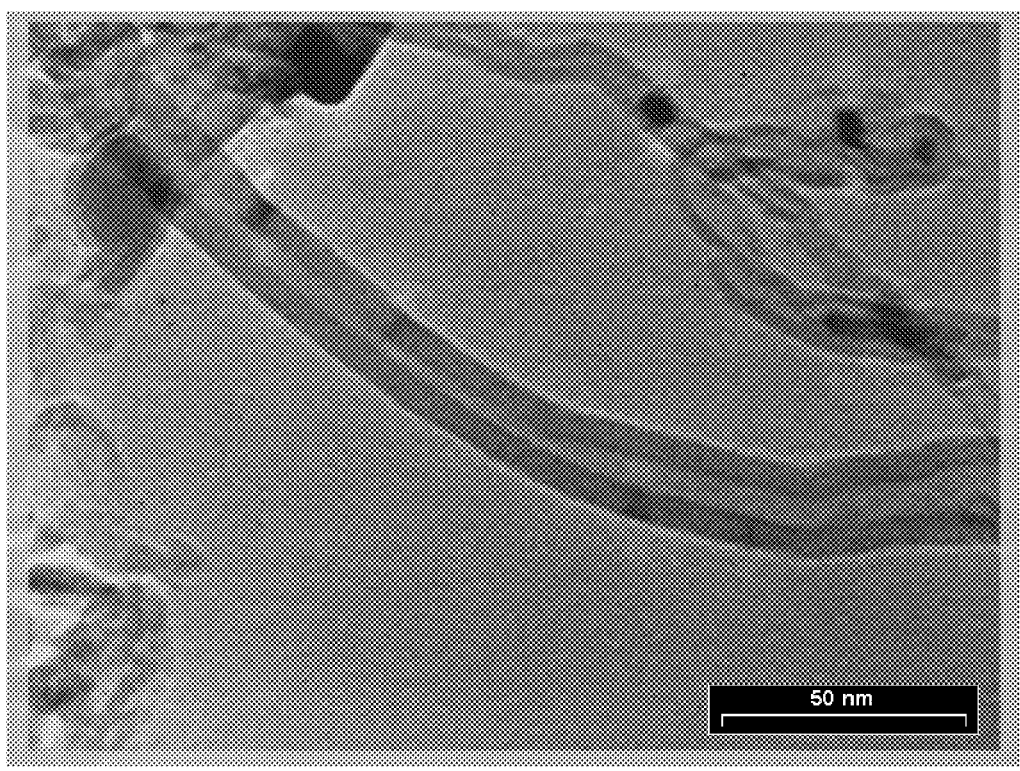
Figure 5D:
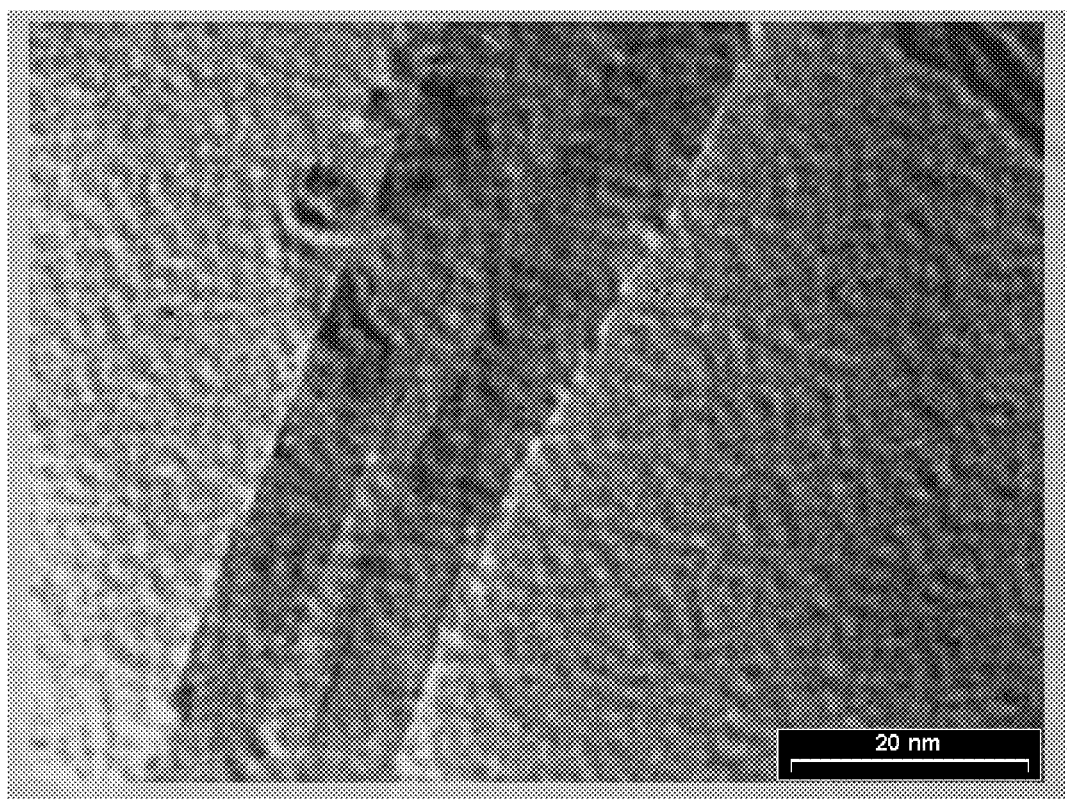

The main RBM bands at 205 and cm$^{-1}$ correspond to SWNTs of about 1.0-1.2 nm in diameter. FIG. 5a shows SEM of produced CNTs in Run 4. CNTs synthesize at the same condition as run 3 except for flow rate of Ar. The flow rate of Ar gas, as the carrier gas of ferrocene, was set at 120 sccm. The deposition efficiency of iron on MgO has increased to 88%, as compared to 60% for the Ar flow rate of 60 sccm. The Fe/MgO catalyst in the reactor contains about 8.8 wt % Fe, as measured by AAS. Long CNTs and/or their bundles of about 25 nm diameter are formed (see FIG. 5a). TEM micrographs of as-prepared CNTs in Run 4 are presented in FIGS. 5b, c, and d. The produced CNTs are predominantly MWNTs of about 15-20 nm, but as shown in FIG. 5b SWNTs of about 1 nm diameter also synthesized. As shown previously in FIG. 2d, CNT loops are formed. Iron nanoparticles (dark circles) distribute inside or on the sidewall of the CNTs.

Figure 5E:
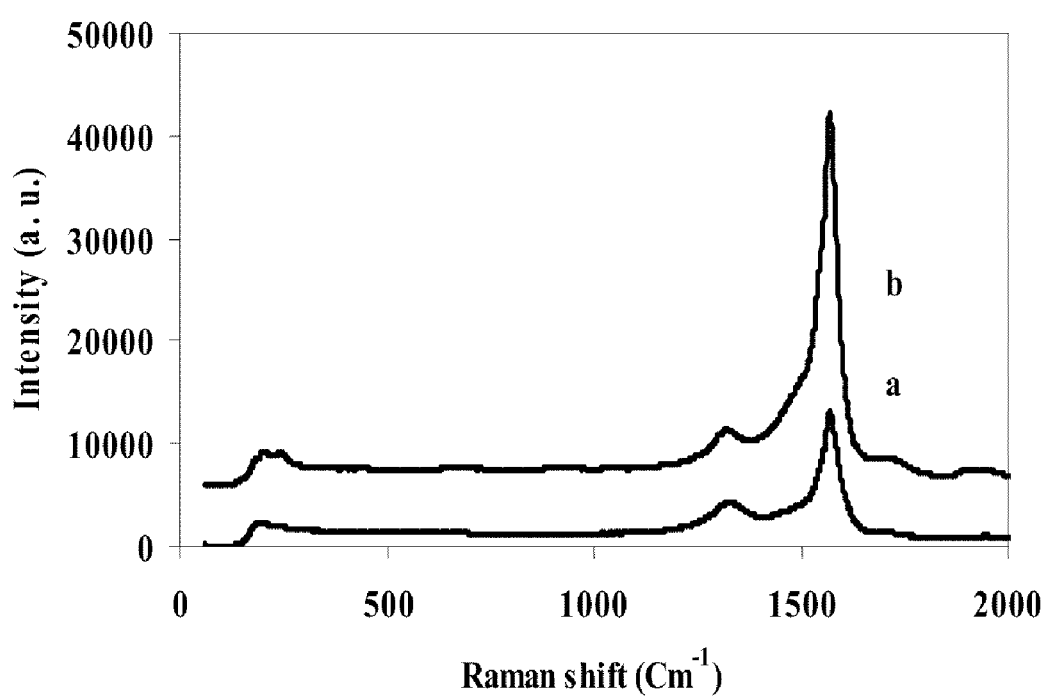

FIG. 5e represents the Raman spectra of the CNTs with 60 and 120 sccm of Ar as the ferrocene carrier gas. The $I_G/I_D$ ratio of Raman band intensities at about 1330 and 1570 cm$^{-1}$ for 60 and 120 sccm are about 3.8 and 9.9, respectively, indicating enhancement of the quality of CNTs with the amount of ferrocene introduced to the system at the higher Ar carrier gas flow rate. The main RBM bands correspond to SWNTs in the range of 1.1-1.2 nm in diameter.

Figure 3:
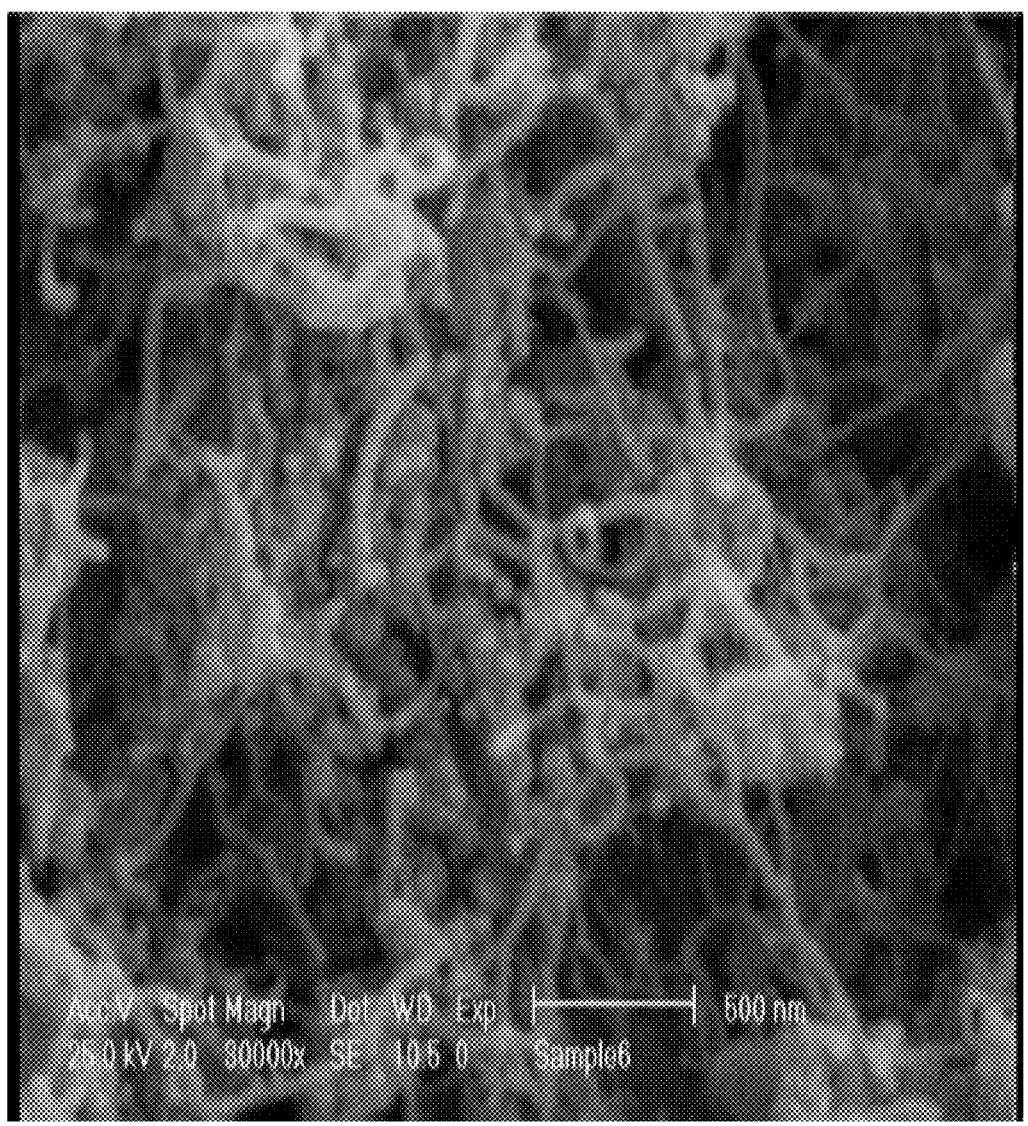
FIG. 3—SEM micrograph of synthesized CNTs of Run 3 with the annular tube.
Figure 6:
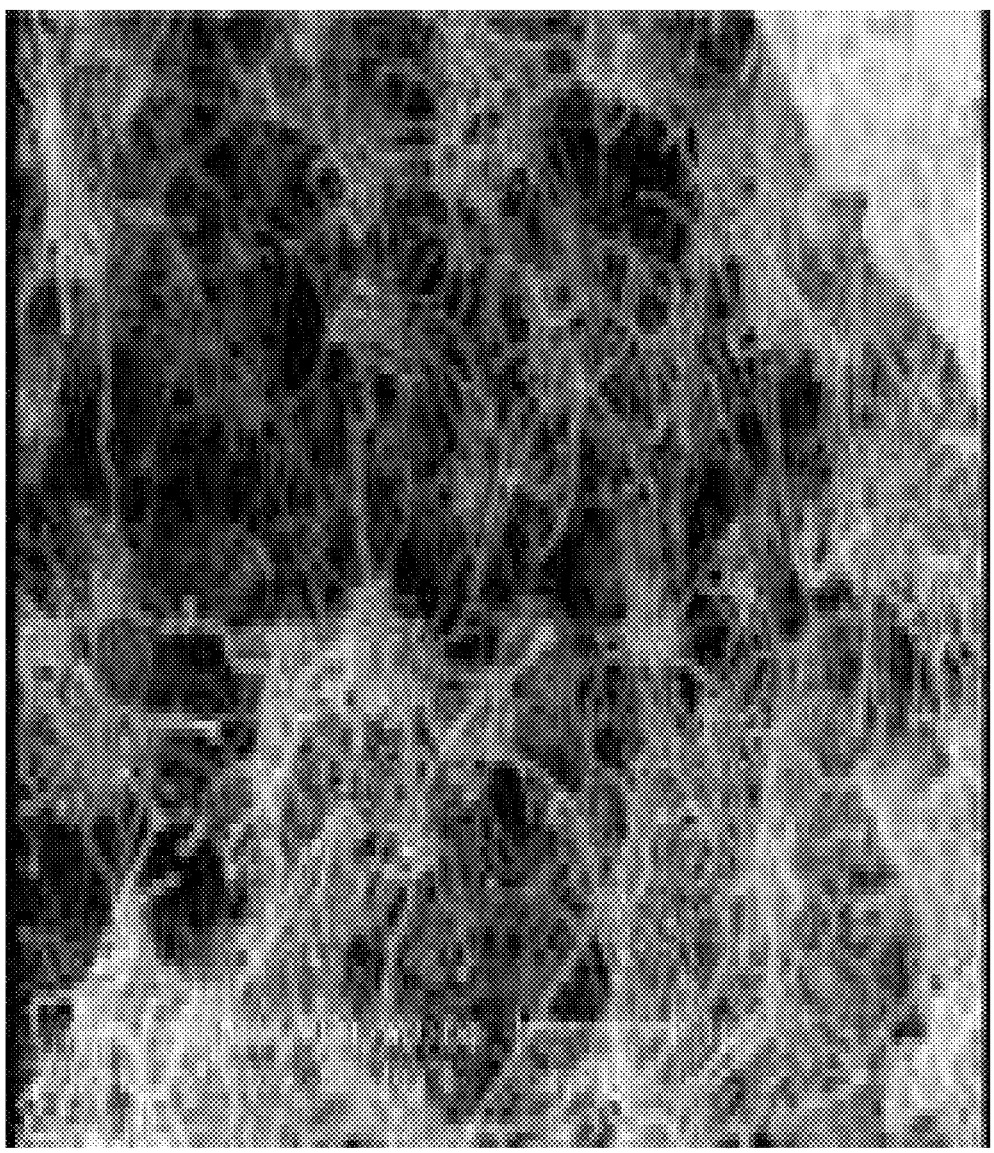
FIG. 6a-6c illustrate SEM micrographs of produced CNTs of (a) run 5, (b) run 6, and (c) Raman spectrum of as grown CNTs of runs (curve a), run 3 (curve b) and run 6 (curve c)
Figure 6:
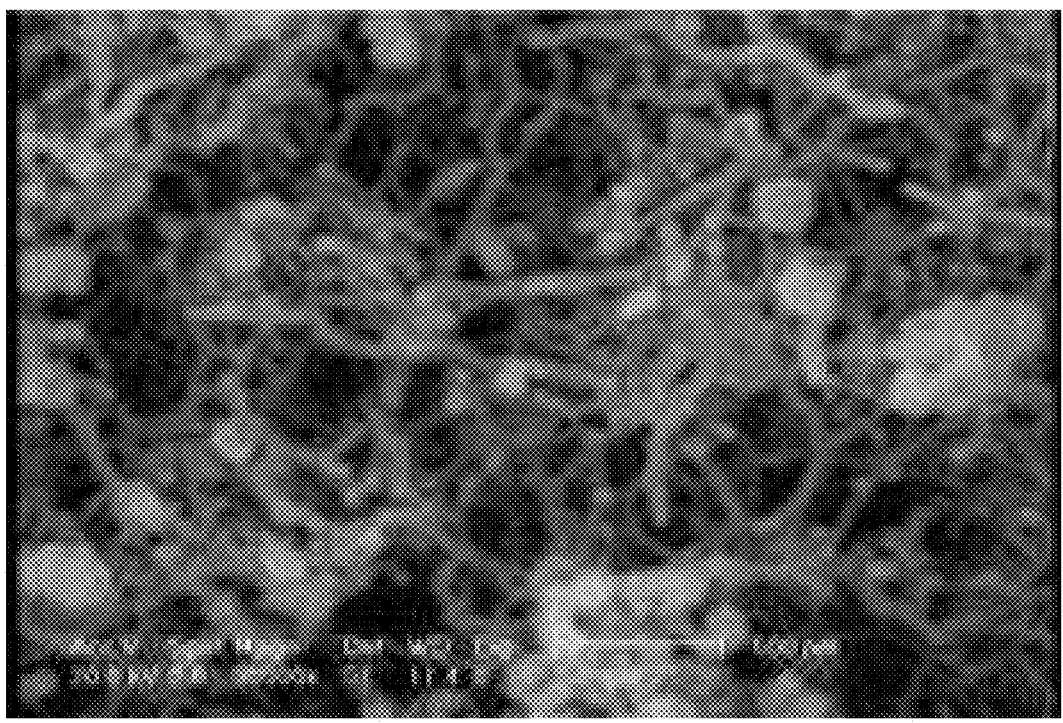
Figure 6:
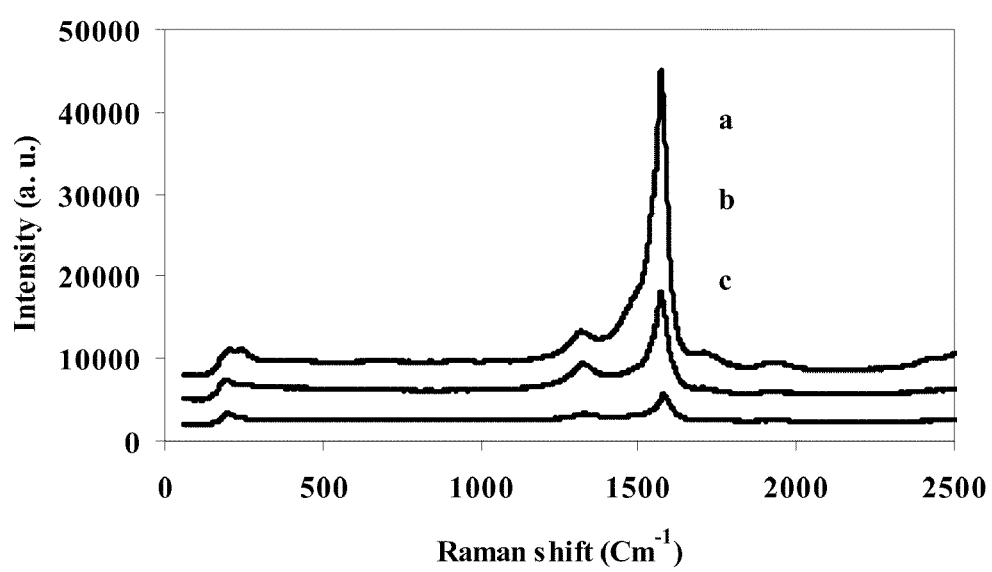

The effect of temperature was investigated by synthesizing CNTs at 900, 950, and 1000° C. in Runs 5, 3, and 6, respectively. The results of CNTs synthesis at 950° C. are shown in FIG. 3. FIGS. 6a and b show the SEM micrographs of as grown CNTs at 900 and 1000° C., respectively. Raman spectra of as grown CNTs at 900° C., 950° C. and 1000° C. are plotted in FIG. 6c.

The $I_G/I_D$ ratios are 10.2, 3.8, and 2.7 for CNTs synthesis at 900, 950, and 1000° C., respectively. This indicates that the quality of CNTs degrades with increasing the synthesis temperature from 900 to 1000° C. At higher temperatures, an enhanced sintering of iron nanoparticles to larger sizes may occur. This would lead to more amorphous carbon. On the other hand, at higher temperatures, the rate of carbon precursors may exceed its rate of consumption for CNTs growth. The excess carbon precursor may accumulate and form amorphous carbon and/or defected CNTs.

The fluidized-bed system introduced in this paper provides an efficient contact of the floating catalyst of ferrocene and MgO particles. The ferrocene preferentially deposit on the MgO with large area rather than the reactor walls. This facilitates the continuous operation of the system. In addition, the iron nanoparticles most probably deposit on the exposed surface of the MgO, where the CNTs grow, rather than in MgO bulk. This enhances the yield of CNTs and reduces the waste of the catalyst in the MgO bulk that occurs in the other CVD methods of CNTs synthesis. Furthermore, in the fluidized-bed system Fe/MgO catalyst will be produced in-situ by stabilization of iron nanoparticles on MgO. The MgO prevents sintering of the iron nanoparticles to larger ones.

Figures 7A, 7B:
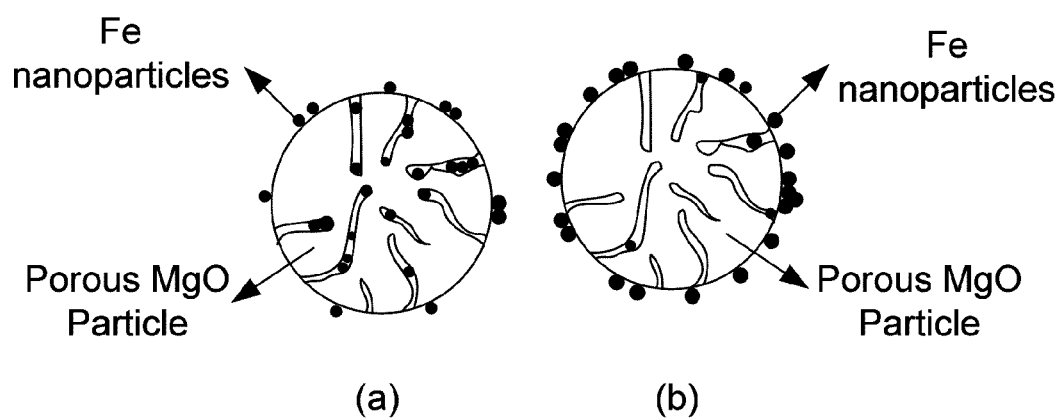
FIG. 7—Schemes of a conventional catalyst (a) with most of the iron nanoparticles buried in the interior surface of MgO and the new catalyst (b) prepared by in-situ deposition of the iron nanoparticles on the external surface of the MgO particles. Long carbon nanotubes grow on the exposed iron nanoparticles.

FIG. 7 illustrates the comparison of the common ex-situ and in-situ Fe/MgO catalysts. In the common catalyst prepared by e.g. impregnation method, a significant amount of the iron catalyst wasted in the porous structure of the MgO particle, while in the in-situ production of the catalyst of this study the iron nanoparticles are deposited on MgO exterior surface, on which the CNTs will grow. MgO particles heated to about 700° C. are exposed to ferrocene, which may be decomposed in the gas phase or on the hot MgO particles. The iron nanoparticles will be stabilized on the MgO particles.

Changes may be made in the construction and the operation of the various components, elements and assemblies described herein or in the steps or the sequence of steps of the methods described herein without departing from the spirit and scope of the invention as defined in the following claims.

We claim:

1. A method for continuous production of carbon nanotubes by chemical vapor deposition of at least one carbon containing compound on a floating catalyst in a fluidized bed reactor wherein said floating catalyst is synthesized inside said fluidized bed reactor by in-situ decomposition of at least one transition metal compound on at least one carrier, comprising steps of: forming transition metal nanoparticles on an exterior surface of said at least one carrier by a decomposition of said at least one transition metal compound in a hot zone of said reactor, wherein said transition metal nanoparticles are iron nanoparticles, and wherein said at least one transition metal compound is kept at 150° C., wherein said at least one carrier is MgO, and wherein said at least one carbon containing compound acts as a carbon source.

2. The method as claimed in claim 1, wherein nitrogen, oxygen, carbon dioxide, water, steam or a combination thereof is introduced into said reactor.

3. The method as claimed in claim 1, wherein said at least one transition metal compound is mixed with said at least one carbon containing compound.

4. The method as claimed in claim 1, wherein said at least one carbon containing compound is selected from the group consisting of alkanes, alkenes, alkynes, naphthenes, aromatics, carbon oxides, ketones, aldehydes, alcohols, esters, organic acids, and a combination thereof, wherein said at least one carbon containing compound is methane.

5. The method as claimed in claim 1, wherein said at least one transition metal compound is selected from the group consisting of an organometallic, a halide, a nitrate, a carbonyl compound of iron, an organometallic, a halide, a nitrate, a carbonyl compound of nickel, an organometallic, a halide, a nitrate, a carbonyl compound of cobalt, an organometallic, a halide, a nitrate, and a carbonyl compound of molybdenum, an organometallic, a halide, a nitrate, and a carbonyl compound of tungsten, or a combination thereof, wherein said at least one transition metal compound is ferrocene.

* * * * *